J. Richards,
Shaft Hanger.

Nº 78,608.  Patented June 2, 1868.

Witnesses.

Inventor.

United States Patent Office.

JOHN RICHARDS, OF CINCINNATI, OHIO.

*Letters Patent No. 78,608, dated June 2, 1868.*

IMPROVEMENT IN HANGER FOR SHAFTING.

*The Schedule referred to in these Letters Patent and making part of the same.*

TO ALL WHOM IT MAY CONCERN:

Be it known that I, JOHN RICHARDS, of Cincinnati, in the county of Hamilton, and State of Ohio, have invented certain new and useful Improvements in Hangers for Shafting; and I do hereby declare the following to be a full and exact description of the same, reference being had to the drawings accompanying and forming a part of this specification, in which—

Similar letters of reference on the two different figures indicate corresponding parts.

The nature of this invention consists in a journal-box for hangers, provided with means of vertical and lateral adjustment, and also constructed to pivot in all directions, so as to adapt itself to the line of the shaft by means of a tubular box-stem, with a concave recess formed in its top, and in convex lugs formed upon the box to fit into this recess, allowing a rocking motion in the line of the shaft, and in an eye-bolt attached to the box, and passing through the stem to retain the box in its seat, all as hereinafter described.

Hangers for shafting, or, rather, the boxes mounted on the hangers, to be convenient and operate well, require that they should pivot in two directions, in a horizontal plane, and vertically in the line of the shaft, and at the same time have an adjustment independent of the hanger-frame, both vertically and laterally.

These conditions are found in the hanger with my improvements, and, from its peculiar construction, the cost is not increased over hangers with a single or no adjustment, and the box is freely pivoted in all directions with but little fitting.

To enable others skilled in the art to make and use my invention, I will proceed to describe the mode of constructing and manner of operating the same, with the aid of the drawings.

Figure 1:
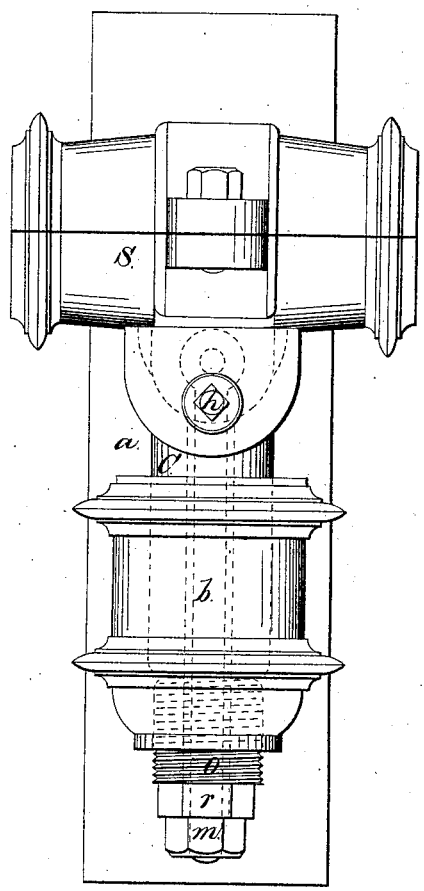
Figure 1 is a front elevation of a post or bracket-hanger with my improvements.

The bracket or supports A are formed in the usual manner, to bolt to a vertical face, or suspend from a ceiling, as the nature of the work demands. The box or shell $b$ is cast upon and forms part of the bracket, and is bored out to receive the stem C. On the top of this stem is formed a socket, concave in the bottom, as shown by dotted lines, fig. 1. On the bottom of the box S are cast two strong lugs, $d\ d$, with their faces formed convex, to fit the bottom of the recess in C.

The box is retained in its seat by the eye-bolt E and set-screws $h\ h$. The eye-bolt E is secured to the box by a strong pin, $n$, passing through the two lugs $d\ d$, as shown by dotted lines in fig. 2.

$o$ is a screw of large diameter, tapped into and through the bottom of shell $b$, the stem C resting on its top as shown. It is also formed with a cylindrical hole throughout its length, to admit the eye-bolt E, and has on its lower end a hexagonal extension, $r$, for the purpose of applying a wrench.

Figure 2:
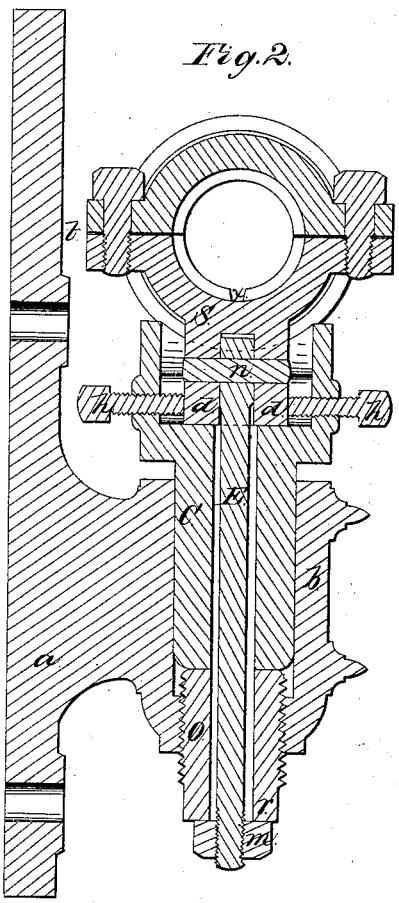
Figure 2 is a vertical section through fig. 1, transverse to the line of the shaft.

The lugs $d$ on the box S, are left with a space for the movement and lateral adjustment of the box S, to and from the plate at $l$, fig. 2, by means of the screws $h\ h$, as shown, the hole through the stem C and screw-plug $o$ being formed large enough to admit of the lateral movement of the bolt E with box S, as will be understood. X is an oil-chamber formed in the box S, to insure lubrication. $m$ is a nut on the eye-bolt E, and holds the box S in its seat, besides clamping the stem C and piece $o$ together, and holding the latter from turning when the box is adjusted.

To adjust the shaft vertically, the nut $m$ and screws $h\ h$ are loosened, and the stem C and box S raised or lowered by turning the screw-piece $o$, and to adjust laterally, the nut $m$ is loosened, and the box moved by means of screws $h\ h$.

Having thus described the nature and objects of my invention, I claim as new, and desire to secure by Letters Patent—

1. The stem C, formed to receive the lugs $d$, substantially as shown.

2. The combination of the adjusting-screws $h\ h$ and eye-bolt E, when used substantially as herein shown and for the purposes specified.

3. The cylindrical screw-piece $o$, for adjusting the box, when formed to receive the bolt E, in the manner and for the purposes described.

4. The screws $h\ h$, in combination with the stem-piece C, for adjusting the box S, as herein shown and for the purposes specified.

5. The stem-piece C, screw-piece $o$, eye-bolt E, and screws $h\ h$, combined and operating substantially in the manner and for the purposes specified.

JOHN RICHARDS.

Witnesses:
    DAN. L. LYON,
    W. S. KELLEY.